US007427864B2

(12) United States Patent
Williams et al.

(10) Patent No.: US 7,427,864 B2
(45) Date of Patent: Sep. 23, 2008

(54) ION BALANCE MONITOR

(75) Inventors: Bruce T. Williams, Lockport, NY (US); Jerzy Kieres, East Amherst, NY (US); Maciej A. Noras, Lockport, NY (US)

(73) Assignee: Trek, Inc., Medina, NY (US)

( * ) Notice: Subject to any disclaimer, the term of this patent is extended or adjusted under 35 U.S.C. 154(b) by 252 days.

(21) Appl. No.: 11/261,994

(22) Filed: Oct. 28, 2005

(65) Prior Publication Data

US 2006/0102852 A1 May 18, 2006

Related U.S. Application Data

(60) Provisional application No. 60/623,670, filed on Oct. 29, 2004.

(51) Int. Cl.
*B01D 59/44* (2006.01)
*H01J 27/00* (2006.01)
*G01N 27/62* (2006.01)

(52) U.S. Cl. ...................... 324/464; 361/213; 361/231; 361/230; 250/489; 250/423 R

(58) Field of Classification Search ................. 324/464; 361/213, 231, 230; 250/489, 423 R
See application file for complete search history.

(56) References Cited

U.S. PATENT DOCUMENTS 4,740,862 A 4/1988 Halleck
5,506,507 A 4/1996 Schwierzke et al.
6,252,233 B1 * 6/2001 Good ..................... 250/423 R
6,259,591 B1 7/2001 Pitel et al.
6,433,552 B1 8/2002 Williams
6,717,414 B1 * 4/2004 Rodrigo et al. ............. 324/464
7,180,722 B2 * 2/2007 Jacobs et al. ................ 361/231

OTHER PUBLICATIONS

International Search Report for PCT//US05/38917, Feb. 7, 2008, Trek, Inc.
Written Opinion for PCT/US05/38917, Feb. 7, 2008, Trek, Inc.

* cited by examiner

*Primary Examiner*—Nikita Wells
(74) *Attorney, Agent, or Firm*—Hodgson Russ LLP

(57) ABSTRACT

An ion balance monitor for simultaneous monitoring of the positive and negative ion production rates, and therefore ion concentration, by measurement of currents resulting from the presence of airborne ions as created for example by an air (gas) ionizer. Additionally it examines the ion balance by comparing the aforementioned currents. Information acquired in this way can be used in real time monitoring of the ionizer. Ion balance and production rate of ions of both polarities can be recorded by the ion monitor, regardless of the type of the ionizer. The ion monitor can provide a feedback signal needed to keep an ionizer system in balance.

18 Claims, 4 Drawing Sheets

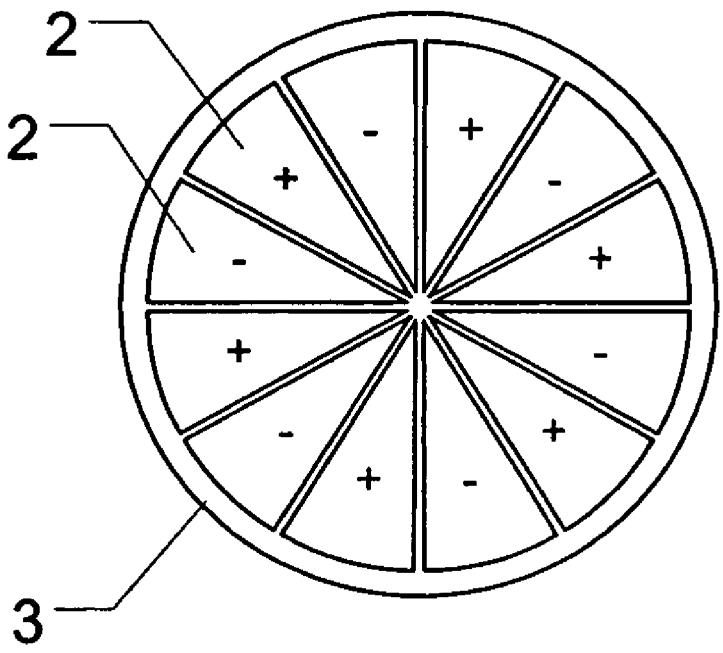
Figure 2-a.
12 sections plate
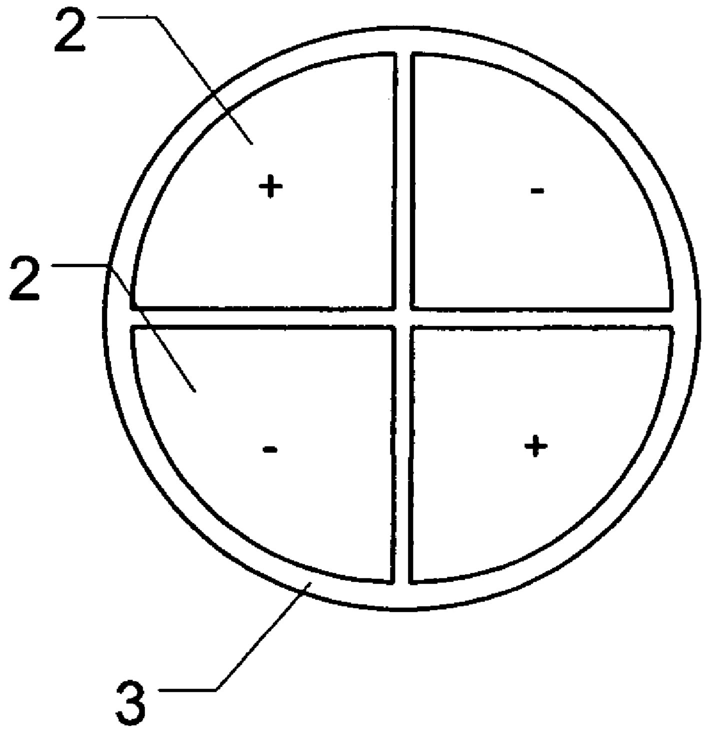
Figure 2-b.
4 sections plate

ION BALANCE MONITOR

CROSS REFERENCE TO A RELATED APPLICATION

Applicants claim priority based on Provisional Application No. 60/623,670 filed Oct. 29, 2004 and entitled "Ion Balance Monitor" which is incorporated by reference.

BACKGROUND OF THE INVENTION

This invention relates to airborne ion balance and concentration sensing and monitoring.

Static electric charge accumulation can cause severe problems in variety of manufacturing processes and industrial operations. One of the methods of coping with electric charge build-up is to create a volume region of highly ionized air in the immediate vicinity of objects that are to be protected. If these objects become electrically charged, they attract air ions of the opposite polarity. This, in turn, leads to electric charge neutralization. Ionized air, containing ions of positive and negative polarities, is usually provided by an air ionizing system. Such system has to be periodically verified in order to assure its proper functioning, and in critical environments a continuous ionizer system monitoring may be necessary.

A typical evaluation of an air (gas) ionizer consists of three parts. The first two tests measure the ionizer's capability of delivering positive and negative ions at the desired production rate level, so the protected objects can be neutralized within certain time limits. According to the ANSI ESD STM 3.1-2000 standard (EOS/ESD Association Standard for Protection of Electronic Discharge Susceptible Items - Ionization, ESD Association 2000), this ability is determined by the time required to discharge a charged plate, having a specified capacitance relative to ground, between specified voltage levels. To accomplish this, the plate is first pre-charged to an initial voltage level and then allowed to discharge to typically 10% of the initial test voltage. The time required for the discharge is recorded for both polarities of the initial voltage. These two measurements are called discharge time tests.

The third part of ionizer evaluation is a voltage offset measurement. A test plate is first shorted to the earth ground to remove any residual charge. The plate is then disconnected from the ground and allowed to float. The voltage measured on the plate after plate voltage stabilization is a result of the net charge collected from the airborne ions impinging on the plate. The stabilized plate voltage value also indicates the voltage level to which objects placed into the ion field that are of similar size and geometry as the test plate will be driven to by the ion field.

Evaluation of the air (gas) ionizer system using the above described prior art method is time consuming and not robust enough for application in continuous ionizer monitoring. Reference may be made to U.S. Pat. No. 6,130,815 issued Oct. 10, 2000 entitled "Apparatus and Method for Monitoring of Air Ionization", U.S. Pat. No. 5,506,507 issued Apr. 9, 1996 entitled "Apparatus for Measuring Ions in a Clean Room Gas Flow Using a Spherical Electrode" and U.S. Pat. No. 6,433,522 issued Aug. 13, 2002 entitled "Floating Plate Monitor", the disclosures of all three of the foregoing patents being incorporated herein by reference. Proper monitoring requires simultaneous measurement of ion balance (voltage-offset test) and of ion production rate for both ion polarities (discharge time test). Existing charge plates and charged plate monitors are not capable of such simultaneous test. Usually, these instruments monitor the voltage offset only, and in certain systems additionally provide a feedback signal to the ionizer. This feedback information about ion imbalance can be used to control the ionizer system; however it does not indicate whether the ionizer produces amounts of ions sufficient enough to discharge the protected object within the desired time. It informs only about the ratio of positive vs. negative ions reaching the plate by indicating the voltage offset.

SUMMARY OF THE INVENTION

It is therefore the purpose of the method and apparatus of this invention to overcome the disadvantages of the prior art methods and devices by providing:

1. An ion current detector assembly that can be placed into an ion field.
2. The ion detector having the capability to provide simultaneous output signals corresponding to the amount of positive and negative ions impinging onto sensitive electrode surfaces.
3. Circuitry to process the detector signals to provide information for monitoring, recording, or control purposes, the positive and negative ion current flow.

This invention, a new type of ion balance monitor, is capable of simultaneous monitoring of the positive and negative ion production rates (and, therefore, ion concentration) by measurement of currents resulting from the presence of airborne ions (as created by an air (gas) ionizer, for example). Additionally it examines the ion balance by comparing the aforementioned currents. Information acquired in this way can be used in real time monitoring of the ionizer. Ion balance and production rate of ions of both polarities can be recorded by the new ion monitor, regardless of the type of the ionizer. Robustness and feasibility of the newly developed instrument were verified against the standard charged plate monitor unit. The ion monitor significantly shortens the time necessary to evaluate an ionizer, and may additionally provide a feedback signal needed to keep an ionizer system in balance.

Additional applications of the invention include any ion balance and ion concentration measurements and monitoring in gaseous environments.

The foregoing and additional advantages and characterizing features of the invention will become clearly apparent upon a reading of the ensuing detailed description together with the included drawing.

BRIEF DESCRIPTION OF THE DRAWING

FIG. 2*a* is a plan view of one form of charge plate;

FIG. 2*b* is a plan view of another form of charge plate;

DETAILED DESCRIPTION OF THE INVENTION

It should be understood that the invention is not limited to the embodiment described below since various modifications and enhancements can be incorporated without departing from the scope of the invention.

Figure 1:
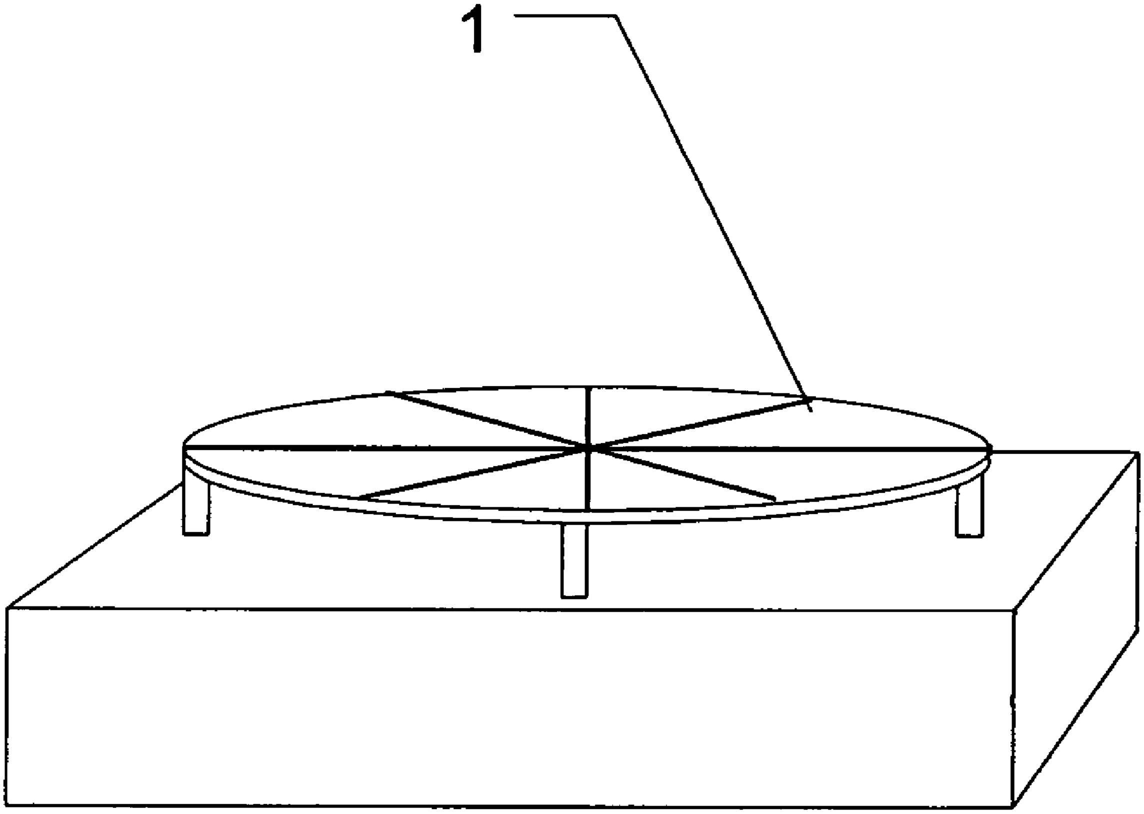
FIG. 1 is a perspective view of an ion collecting instrument with charge plate constructed in accordance with the invention.
Figure 3:
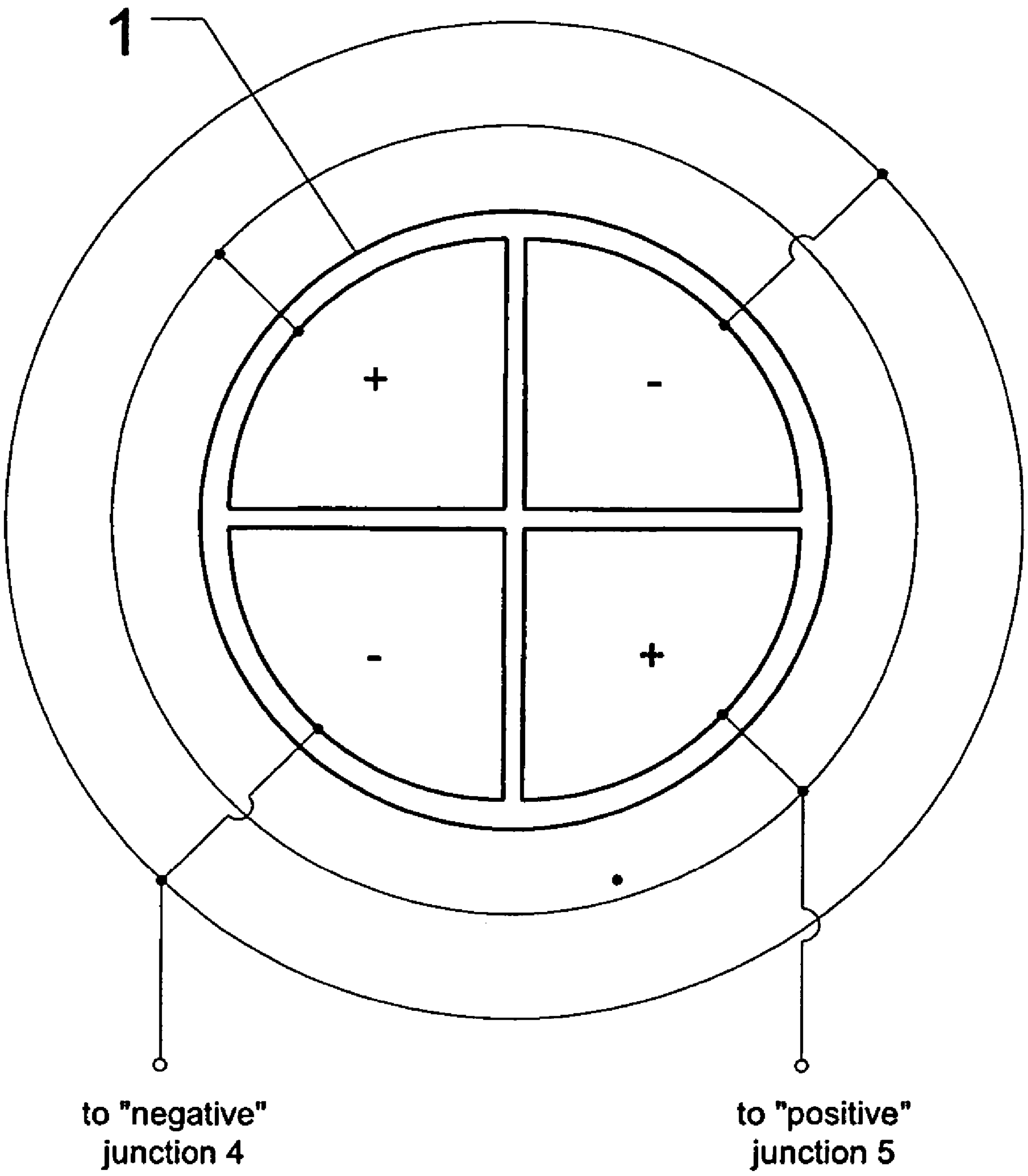
FIG. 3 is a view similar to FIG. 2*b* and illustrating electrical connections between sections of the charge plate.

FIG. 1 is a perspective view of an ion collecting instrument according to the invention provided with a charge plate 1. FIGS. 2*a* and 2*b* are top views of two embodiments of the ion collecting plate 1 in accordance with the invention. The plate 1 has collector sections 2 made of a conducting material (i.e. metal) that are electrically separated from each other. The electrical (and physical) separation may be assured for example by use of any dielectric and/or static dissipative material 3. FIG. 2*a* presents, as an example, the plate 1 consisting of twelve (12) sections 21 and FIG. 2*b* shows four (4) collector segments 2*b*. While a plate 1 is shown, the sections can be other surfaces, volumes or any other two or three dimensional geometries. The collector sections are biased with either positive or negative voltage applied to them. The applied voltage value is adjustable for both positive and negative polarities. Each positively charged section neighbors with two negatively charged segments, and each negatively charged section neighbors with two positively charged segments, the whole plate being populated with intermittently positive and negative potential areas, as shown in FIGS. 2*a* and 2*b*. All positively biased sections of the plate are electrically connected together at the connection point 5 as shown in FIG. 3. All negatively biased sections are electrically connected at the connection point 4 shown in FIG. 3.

The ion collecting conductive sections 2 of the plate 1 are pre-biased with a voltage applied to them. Positively biased segments will attract negative ions present in the surrounding gaseous environment. This will result in the ion current flowing to the point 5 from all the positive sections of the plate 1. A similar phenomenon occurs on the negatively pre-biased segments. Positive ion current will be flowing from the point 4 (current flows from the negative to the positive potential). The ion currents at the points or junctions are applied as inputs to the circuitry of the ion balance—monitoring instrument shown in FIG. 4.

Figure 4:
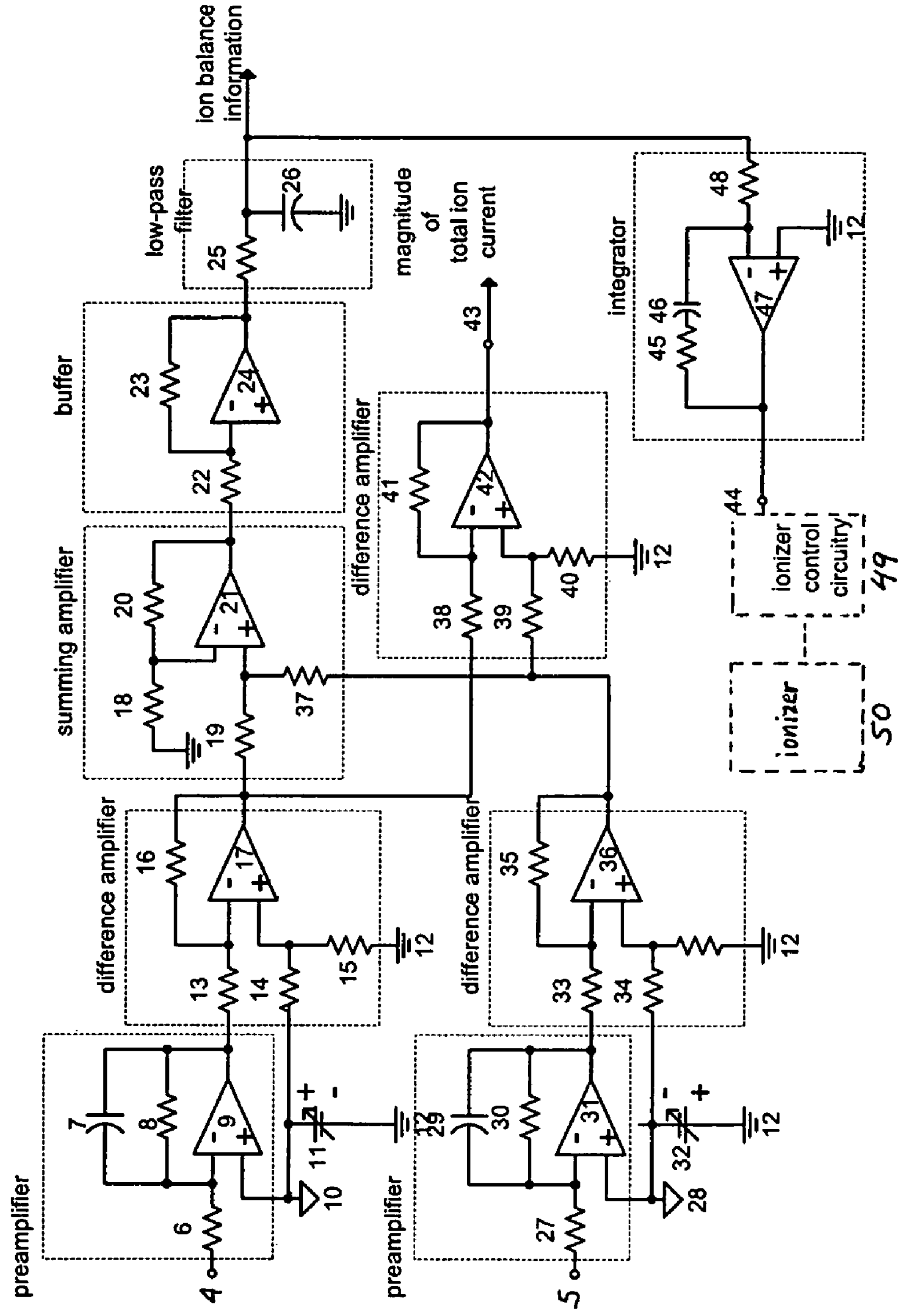
FIG. 4 is a schematic diagram illustrating the circuitry of the ion balance-monitoring instrument.

Referring now in detail to FIG. 4, the negative ions current at junction 4 is delivered to a preamplifier having resistors 6 and 8, a capacitor 7 and an operational amplifier 9. The positive ions current at junction 5 simultaneously goes to a preamplifier having resistors 27, 30, a capacitor 29 and an operational amplifier 31. Adjustable power supplies 11 and 32 are used to pre-bias the ion collecting plates via the connections designated 10 and 28. After passing through the preamplifiers, both negative and positive ion currents have been converted to a corresponding voltage signal and inverted. The negative current signal is then passed to a difference amplifier having resistors 13, 14, 15, 16 and an operational amplifier 17 where the positive voltage bias is subtracted from the signal and the resulting value is inverted. In this way a voltage representation of the negative ion input current is obtained at the output of the operational amplifier 17. Thus, the preamplifier and difference amplifier comprise a first branch of the circuit, the input being junction 4 and the output being the output of the difference amplifier.

In a similar fashion, a voltage representation of the positive ion current is acquired at the operational amplifier 36. The output of the difference amplifier comprising operational amplifier 36 is the output of a second branch of the circuit, the second branch having junction 5 and comprising the associated preamplifier and difference amplifier. Both voltage signals can now be used for determining the amount of ions reaching the charged plate ion collecting plates. This, in turn, provides information about ionizer system efficiency. If the positive and negative ion voltage signals are added, as is done in the summing amplifier having resistors 18, 19, 20, 37 and operational amplifier 21, the ion balance offset can be determined. After passing through a buffer comprising resistors 22, 23 and an operational amplifier 24, ion balance information can be displayed for the operator of the instrument and also further used for adjusting the ion balance at the ionizer. This is, for example, realized by a low-pass filtering circuit having resistor 25 and capacitor 26 and by an integrating circuit comprising resistors 45, 48, capacitor 46, and operational amplifier 47. These two circuits are used to tune a feedback signal that is to be provided to control circuitry 49 of the ionizer 50 via a terminal 44.

The instrument of the invention simultaneously measures all three parameters characterizing operation of an ionizer system: the positive ion production rate, the negative ion production rate, and the ion balance. Magnitudes of the ion currents recorded on the positively and negatively biased segments of the charge plate provide information about ion production rate, and, in turn, ion concentration for both polarities in the vicinity of the plate. The ion currents can be calibrated in terms of corresponding discharge times. Reference may be made to EOS/ESD Association Technical Report: Alternate Techniques For Measuring Ionizer Voltage Offset Voltage and Discharge Time, ESD TR 13-02, ESD Association, 2002(equivalent of the measurement recommended by the standard ANSI ESD STM 3.1-2000 referred to earlier herein). The comparison of both ion currents give the information about the ion balance: if the sum of the negative and the positive ion current is equal to zero, the ionizer system provides ion balance in the vicinity of the ion balance monitor. If this sum is different from zero, this information can be further processed and used for adjusting the output of the ionizer system.

Thus, the method and apparatus of the invention provides improved airborne ion balance and concentration sensing and monitoring. The invention allows for direct continuous measurement and quantitative evaluation of positive and negative ion concentrations in the air or in any other gaseous environment into which it is placed. Currently used methods and devices such as charged plates coupled to charged plate monitors and ion balance monitors are capable of sensing the integrated combined effect of both positive and negative ions that impact upon a single sensing element but cannot provide simultaneous particular polarity ion current flow information. The method and apparatus of the invention permits simultaneous separation of both positive and negative ion concentrations and provides a direct measurement of the current produced by each ion type.

It is therefore apparent that the invention accomplishes its intended objectives. While embodiments of the invention have been described in detail, that is done for the purpose of illustration, not limitation.

The invention claimed is:

1. An ion balance monitor comprising:

a) a surface comprising a plurality of electrically conducting and electrically separated sections;

b) junctions to apply positive and negative electrical bias potentials to respective ones of said sections; and c) a measurer to measure the positive and negative currents produced in said sections in response to ion impingement on each said sections from an ion field into which said surface is placed.

2. The ion balance monitor according to claim 1, wherein said measurer to measure the positive and negative currents comprises preamplifiers for converting positive and negative ion currents into positive and negative ion voltage signals containing information on the amount of positive and negative ions reaching said sections.

3. The ion balance monitor according to claim 2, further including a summing amplifier for adding the positive and negative ion voltage signals to determine ion balance offset.

4. The ion balance monitor according to claim 3, further including a circuit utilizing the ion balance to provide a feedback control signal.

5. The ion balance monitor according to claim 1, wherein each section to which positive electrical bias potential is applied is located between two sections to which negative electrical bias potential is applied and wherein each section to which negative electrical bias potential is applied is located between two sections to which positive electrical bias potential is applied.

6. An ion balance monitoring method comprising:

a) providing a surface comprising a plurality of electrically conducting and electrically separated sections;

b) applying positive and negative electrical bias potentials to respective ones of said sections; and c) measuring the positive and negative currents produced in said sections in response to ion impingement on each of said sections from an ion field into which said surface is placed.

7. The ion balance monitoring method according to claim 6, wherein said measuring the positive and negative currents comprises converting positive and negative ion currents into positive and negative ion voltage signals containing information on the amount of positive and negative ions reaching said sections.

8. The ion balance monitoring method according to claim 7, further including adding the positive and negative ion voltage signals to determine ion balance offset.

9. The ion balance monitoring method according to claim 8, further including utilizing the ion balance offset to provide a feedback control signal.

10. The ion balance monitoring method according to claim 6, wherein said surface is provided in a manner such that each section to which positive electrical bias potential is applied is located between two sections to which negative electrical bias potential is applied and each section to which negative electrical bias potential is applied is located between two sections to which positive electrical bias potential is applied.

11. An ion balance monitor comprising:

a) a charge plate adapted to be exposed to an ionized atmosphere and comprising a plurality of collector sections of electrically conducting material electrically separated from each other;

b) a first junction for applying positive bias voltage to one-half of the plurality of collector sections to attract negative ions from the ionized atmosphere thereby resulting in a negative current flow associated with said one-half of the collector sections;

c) a second junction for applying negative bias voltage to a remaining one-half of the plurality of collector sections to attract positive ions from the ionized atmosphere thereby resulting in a positive current flow associated with said remaining are half of the collector sections;

d) a processing circuit comprising first and second branches each having an input and an output;

e) a first preamplifier for applying the negative current flow to the input of said first circuit branch;

f) a second preamplifier for applying the positive current flow to the input of said second circuit branch;

g) each of said first and second branches of said processing circuit converting the respective negative and positive ion currents to a corresponding negative and positive voltage signal and removing bias from the signals;

h) so that the outputs of said first and second branches of said processing circuit are negative and positive ion voltage signals, respectively, containing information on the amount of negative and positive ions attracted to the collector sections of the charge plate.

12. The ion balance monitor according to claim 11 further including an adder operatively connected to the outputs of said first and second branches of said processing circuit for adding the negative and positive ion voltage signals to determine an ion balance offset.

13. The ion balance monitor according to claim 12 further including a filter and integrator combination operatively connected to said adder for providing a feedback signal to control ionization of the atmosphere.

14. The ion balance monitor according to claim 11, wherein each collector section to which positive electrical bias potential is applied is located between two collector sections to which negative electrical bias potential is applied and wherein each collector section to which negative electrical bias potential is applied is located between two collector sections to which positive electrical bias potential is applied.

15. A method for controlling an ionizer for delivering positive and negative ions to an atmosphere comprising:

a) sampling positive ions in the atmosphere to provide a positive ion voltage signal representative of positive ion production rate associated with the ionizer;

b) simultaneously sampling negative ions in the atmosphere to provide a negative ion voltage signal representative of negative ion productions rate associated with the ionizer;

c) adding the positive and negative ion voltage signals to provide an ion balance parameter; and d) adjusting the output of the ionizer if the ion balance parameter is unequal to zero.

16. The method for controlling an ionizer according to claim 15 wherein said sampling positive ions and simultaneously sampling negative ions comprises:

a) providing a surface comprising a plurality of electrically conducting and electrically separated sections;

b) applying positive and negative electrical bias potentials to respective ones of said sections; and c) providing said positive and negative ion voltage signals from positive and negative currents produced in said sections in response to ion impingement on each said sections from the atmosphere into which said surface is placed.

17. A system for delivering positive and negative ions to an atmosphere comprising:

a) an ionizer for producing said positive and negative ions;

b) an ion balance monitor for simultaneously sampling positive and negative ions in the atmosphere to provide respective positive and negative ion voltage signals representative of positive and negative ion production rate associated with the ionizer, said ion balance monitor adding the positive and negative ion voltage signals to provide an ion balance parameter; and c) a circuit operatively associated with said ion balance monitor for providing a feedback control signal to said ionizer to adjust output of said ionizer if the ion balance parameter is unequal to zero.

18. The system according to claim 17, wherein said ion balance monitor comprises:

a) a surface comprising a plurality of electrically conducting and electrically separated sections;

b) junctions to apply positive and negative electrical bias potentials to respective ones of said sections; and c) a circuit for providing said positive and negative ion voltage signals from positive and negative currents produced in said sections in response to ion impingement on each said sections from the atmosphere into which said surface is placed.

* * * * *